US011099965B2

(12) United States Patent
Fujiwaka

(10) Patent No.: US 11,099,965 B2
(45) Date of Patent: Aug. 24, 2021

(54) MANAGEMENT SYSTEM, TEST METHOD AND RECORDING MEDIUM

(71) Applicant: NEC Corporation, Tokyo (JP)

(72) Inventor: Masaya Fujiwaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 570 days.

(21) Appl. No.: 16/077,791

(22) PCT Filed: Feb. 16, 2017

(86) PCT No.: PCT/JP2017/005620
§ 371 (c)(1),
(2) Date: Aug. 14, 2018

(87) PCT Pub. No.: WO2017/145899
PCT Pub. Date: Aug. 31, 2017

(65) Prior Publication Data
US 2021/0191836 A1 Jun. 24, 2021

(30) Foreign Application Priority Data

Feb. 24, 2016 (JP) .............................. JP2016-032595

(51) Int. Cl.
G06F 9/44 (2018.01)
G06F 11/34 (2006.01)
G06F 9/455 (2018.01)

(52) U.S. Cl.
CPC ...... *G06F 11/3457* (2013.01); *G06F 9/45558* (2013.01); *G06F 11/3414* (2013.01); *G06F 2009/45562* (2013.01)

(58) Field of Classification Search
CPC .................................................. G06F 11/3457
(Continued)

(56) References Cited

U.S. PATENT DOCUMENTS 6,209,033 B1 * 3/2001 Datta ................. H04L 41/0813
370/232
2007/0136732 A1 6/2007 Saitoh et al.
(Continued)

FOREIGN PATENT DOCUMENTS

JP 2006-343899 A 12/2006
JP 2007-164429 A 6/2007
(Continued)

OTHER PUBLICATIONS

International Search Report for PCT Application No. PCT/JP2017/005620, dated May 23, 2017.
(Continued)

*Primary Examiner* — Timothy A Mudrick
(74) *Attorney, Agent, or Firm* — Sughrue Mion, PLLC

(57) ABSTRACT

To provide a management system capable of providing a system enhancing an efficiency of an entire system while preventing an adverse effect on the system on an operational environment. A management system that conducts a test using a system in operation includes: simulation unit that estimates a system configuration and a used amount of a plurality of resources being required for executing the test singly; acquisition unit that acquires information about the used amount of the plurality of resources included in the system in operation; and management unit that calculates a differential system component different from the configuration of the system in operation for the estimated system configuration, and determines a free resource and a resource to be newly added in the system in operation, the free resource and the resource to be newly added being used for applying a load to the differential system component.

20 Claims, 16 Drawing Sheets

(58) Field of Classification Search
USPC .......................................................... 703/21
See application file for complete search history.

(56) References Cited

U.S. PATENT DOCUMENTS

| | | | | |
|---|---|---|---|---|
| 2007/0198797 A1* | 8/2007 | Kavuri | .................. | G06F 3/0653 |
| | | | | 711/165 |
| 2009/0055823 A1* | 2/2009 | Zink | ....................... | G06F 30/20 |
| | | | | 718/100 |
| 2010/0100880 A1 | 4/2010 | Shigeta et al. | | |
| 2010/0325263 A1* | 12/2010 | Raja | ....................... | H04L 49/90 |
| | | | | 709/224 |
| 2014/0007043 A1* | 1/2014 | Aliseychik | ................ | G06F 8/70 |
| | | | | 717/106 |

FOREIGN PATENT DOCUMENTS

| | | |
|---|---|---|
| JP | 2009-245380 A | 10/2009 |
| JP | 2010-102414 A | 5/2010 |

OTHER PUBLICATIONS

English translation of Written opinion for PCT Application No. PCT/JP2017/005620.

* cited by examiner

Fig. 3

| ID | LOAD AMOUNT | CPU UTILIZATION | IO UTILIZATION |
| --- | --- | --- | --- |
| VM200-1 | 500Mbps | 50% | 0% |
| VM200-2 | 400Mbps | 50% | 5% |
| VM200-3 | 200Mbps | 20% | 25% |

Fig. 4

| ITEM | VALUE |
|---|---|
| CPU UTILIZATION | 80% |
| IO UTILIZATION | 50% |

Fig. 7

| ID | LOAD AMOUNT | CPU UTILIZATION | IO UTILIZATION |
|---|---|---|---|
| VM200-1 | 500Mbps | 50% | 0% |
| VM200-4 | 400Mbps | 30% | 5% |
| VM200-3 | 200Mbps | 20% | 15% |

Fig. 8

| ID | TOTAL LOAD AMOUNT | CPU UTILIZATION | IO UTILIZATION |
|---|---|---|---|
| VM200-1 | 1Gbps | 100% | 0% |
| VM200-2 | 400Mbps | 50% | 5% |
| VM200-3 | 400Mbps | 30% | 5% |
| VM200-4 | 400Mbps | 40% | 30% |

Fig. 10

| ITEM | VALUE |
|---|---|
| TYPE | DUPLICATED TEST DATA |
| LOAD AMOUNT | 500Mbps |
| TIME | 120 SECONDS |
| CONFIGURATION CHANGE CONTENT | CHANGE VM200-2 TO VM200-4 |

MANAGEMENT SYSTEM, TEST METHOD AND RECORDING MEDIUM

This application is a National Stage Entry of PCT/JP2017/005620 filed on Feb. 16, 2017, which claims priority from Japanese Patent Application 2016-032595 filed on Feb. 24, 2016, the contents of all of which are incorporated herein by reference, in their entirety.

TECHNICAL FIELD

The present invention relates to a management system, a test method, and a recording medium.

BACKGROUND ART

When a system, such as a World Wide Web (Web) system, a client server system, or a Point Of Sales system (POS), is newly constructed, or when an existing system is changed, for example, when an existing system is updated, the changed system is required to maintain performance at a certain level during an actual operation of the system. In this regard, it is a common technique that a test is conducted before an actual operation is started, and specifications of servers and the number of servers are adjusted and parameters for an Operating System (OS), middleware, or application are tuned in such a way as to meet desired requirements.

For example, a person who conducts a test determines data and resources required for carrying out the test in advance, applies a load to a test target system, measures such as a consumed amount of resources, a turn around time, a throughput, and finds a bottleneck section. In order to avoid a bottleneck, a person who conducts a test evaluation edits a parameter setting file on the OS, middleware, or application, and performs tuning of the OS, middleware, or application. Then, the test is carried out again in order to confirm effects thereof. This cycle is carried out several times, thereby determining appropriate parameter setting values that meet desired requirements.

PTLs 1 and 2 disclose techniques concerning a performance test when an existing system is changed. PTL 1 discloses that a test is executed in a system in an actual operation on an operational environment, and when the test has no problem, test processing is shifted to the operational environment. Further, PTL 2 discloses that it is determined whether or not each server included in a system satisfies performance in a performance test, thereby preventing a lack of processing capability of each server in the changed system.

CITATION LIST

Patent Literature

[PTL 1] Japanese Unexamined Patent Application Publication No. 2009-245380
[PTL 2] Japanese Unexamined Patent Application Publication No. 2006-343899

SUMMARY OF INVENTION

Technical Problem

In the technique described in PTL 1, a system in an actual operation is used as it is in a performance test. Accordingly, in the technique in PTL 1, a load is applied to the system in an actual operation when the performance test is carried out. Therefore, the technique described in PTL 1 may cause an adverse effect on a service running on the system in an actual operation.

Furthermore, in the technique described in PTL 2, determination of whether or not servers satisfy performance, is made for each server. Therefore, it difficult to enhance an efficiency of an entire system, and an increase in resources will be required for the changed system.

In view of the above-described problems, an object of the present invention is to provide a management system capable of providing a system capable of enhancing an efficiency of an entire system while preventing an adverse effect on the system on an operational environment.

Solution to Problem

One aspect of the present invention is a management system that conducts a test using a system in operation. The management system includes:
  simulation unit that estimates a system configuration and a used amount of a plurality of resources being required for executing the test singly;
  acquisition unit that acquires information about the used amount of the plurality of resources included in the system in operation; and
  management unit that calculates a differential system component different from the configuration of the system in operation for the estimated system configuration, and determines a free resource and a resource to be newly added in the system in operation, the free resource and the resource to be newly added being used for applying a load to the differential system component.

Another aspect of the present invention is a test method for conducting a test using a system in operation. The test method includes:
  estimating a system configuration and a used amount of a plurality of resources being required for executing the test singly;
  acquiring information about the plurality of resources included in the system in operation; and
  calculating a differential system component different from the configuration of the system in operation for the estimated system configuration, and executing the test by determining a free resource and a resource to be newly added in the system in operation, the free resource and the resource to be newly added being used for applying a load to the differential system component.

Another aspect of the present invention is a program causing a computer to execute a test using a system in operation. The program causes the computer to execute processing of:
  estimating a system configuration and a used amount of a plurality of resources being required for executing the test singly;
  acquiring information about the plurality of resources included in the system in operation; and
  calculating a differential system component different from the configuration of the system in operation for the estimated system configuration, and executing a test by determining a free resource and a resource to be newly added in the system in operation, the free resource and the resource to be newly added being used for applying a load to the differential system component.

Advantageous Effects of Invention

A management system according to an aspect of the present invention can enhance an efficiency of an entire system while preventing an adverse effect on the system on an operational environment.

BRIEF DESCRIPTION OF DRAWINGS

FIG. 3 is a table illustrating an example of a used amount of resources and a load amount of a system running on operational environment 200 according to the first example embodiment of the present invention;

FIG. 4 is a table illustrating an example of an upper-limit threshold for the used amount of resources of components of the system in an actual operation on operational environment 200 according to the first example embodiment of the present invention;

FIG. 7 is a table illustrating an example of an estimated value of a used amount of resources and a load amount when a test scenario output from simulation unit 105 according to the first example embodiment of the present invention is carried out singly;

FIG. 8 is a table illustrating an example of an estimated value of a used amount of resources and a load amount of each component when a management unit according to the first example embodiment of the present invention carries out a test scenario in a minimum test system configuration on operational environment 200;

FIG. 10 is a table illustrating an example of the test scenario according to the first example embodiment of the present invention;

EXAMPLE EMBODIMENT

Figure 1:
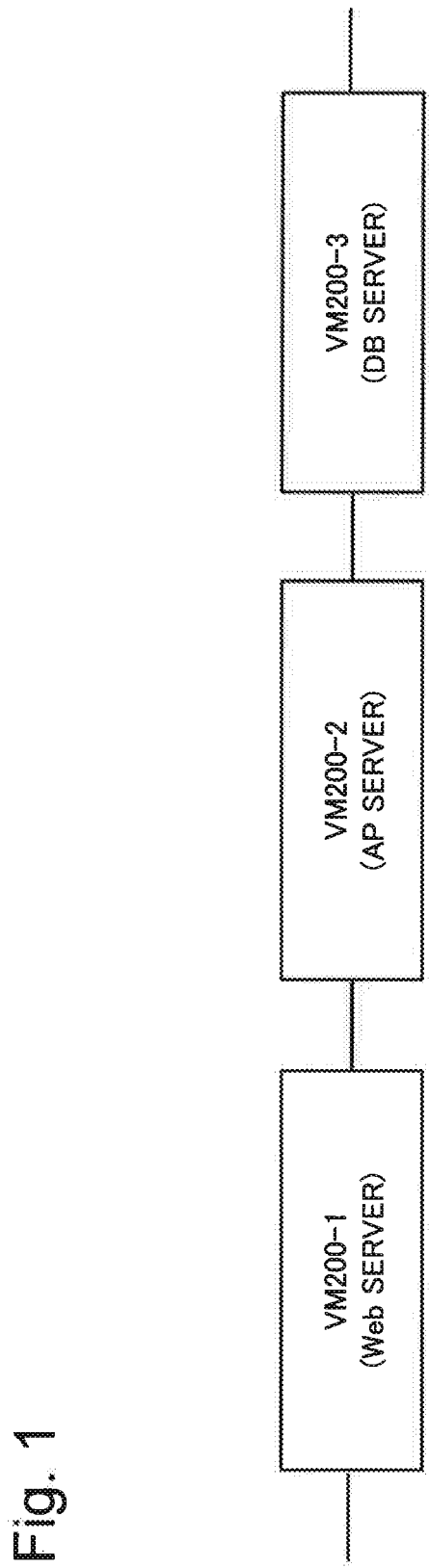
FIG. 1 is a diagram illustrating a configuration example of a system that runs on operational environment 200 according to a first example embodiment of the present invention.

Example embodiments of the present invention will be described below with reference to the drawings. Each example embodiment is merely an example, and the present invention is not limited to the example embodiments. Note that reference numerals in this summary denote respective elements for convenience of explanation as an example for facilitating understanding, and the description of this summary is not intended to limit the present invention. Further, values in FIGS. 3 to 7 are given to respective elements for convenience of explanation as an example for facilitating understanding, but the description is not intended to limit the present invention.

First Example Embodiment

[Description of Configuration]

A first example embodiment of the present invention will be described in detail with reference to the drawings.

FIG. 1 is a configuration example of a system that runs on operational environment 200 according to a first example embodiment. The system according to the first example embodiment is, for example, a Web 3 (three) layer system prepared by using a virtual machine (VM). Note that the system according to the first example embodiment is not limited to a system using a VM.

Further, the system according to the first example embodiment is not limited to a Web 3 layer system. The Web 3 layer system prepared by using the VM will be described below by way of example.

As illustrated in FIG. 1, the Web 3 layer system includes three virtual machines, i.e., VM200-1 (Web server), VM200-2 (application (AP) server), and VM200-3 (database (DB) server).

Each VM is obtained by, for example, virtually constructing an actual computer on which an OS runs by software. One computer is divided into a plurality of VMs, thereby enabling a plurality of users to simultaneously use one computer and enabling different OSs to be executed in parallel. The Web 3 layer system is formed by using, for example, VMs.

Note that in the example of FIG. 1, three VMs are used. However, the number of the VMs is not limited to three, but instead one or more VMs may be used. A plurality of VMs are activated and a plurality of servers are prepared, thereby making it possible to improve a total processing performance.

Figure 2:
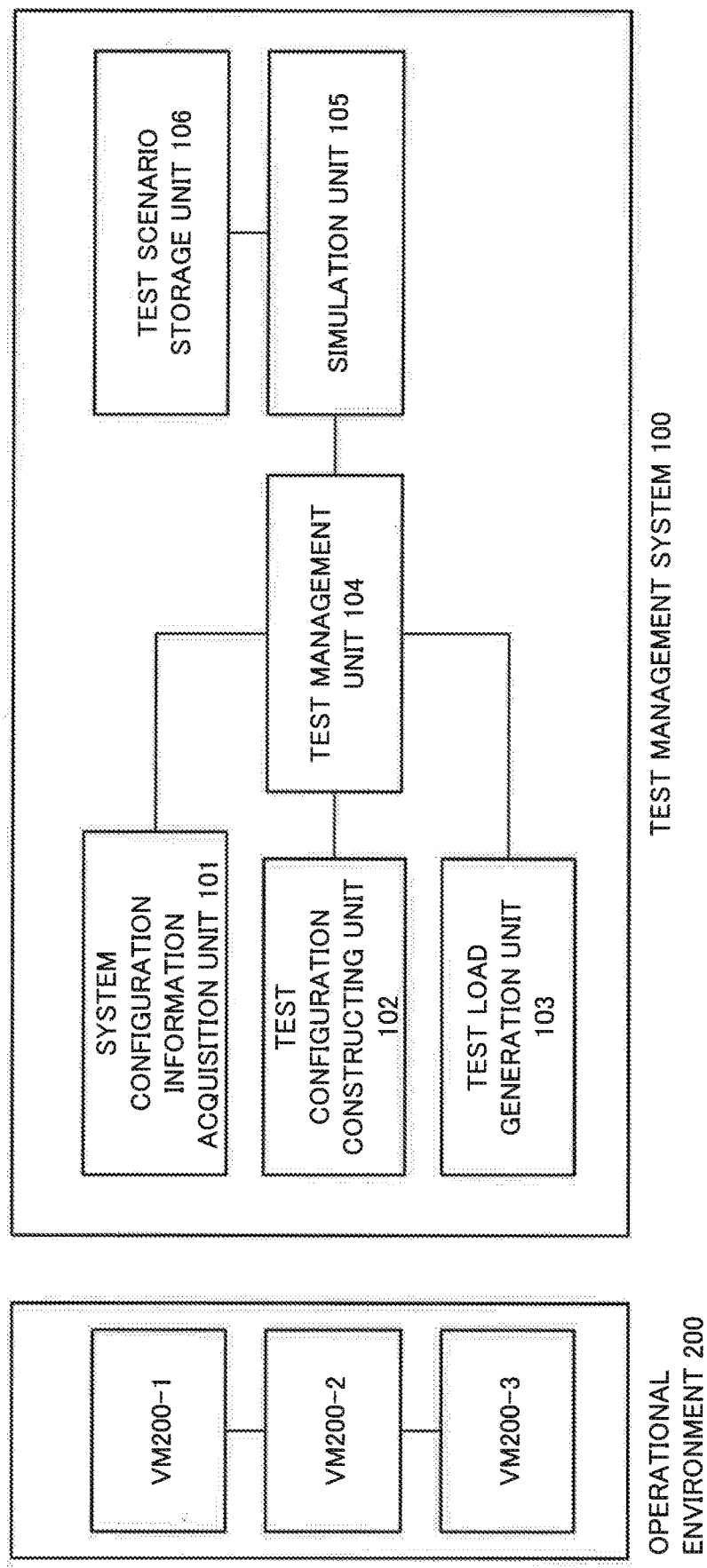
FIG. 2 is a diagram illustrating a configuration example of test management system 100 and a configuration example of operational environment 200 according to the first example embodiment of the present invention.

FIG. 2 is a configuration example of test management system 100 and a configuration example of operational environment 200 according to the first example embodiment.

Test management system 100 according to the first example embodiment includes system configuration information acquisition unit 101, test configuration constructing unit 102, test load generation unit 103, test management unit 104, simulation unit 105, and test scenario storage unit 106.

Note that each of solid lines linking the components 101 to 106 illustrated in FIG. 2 indicates a relationship capable of logical communication and calling. Implementation of the components 101 to 106 in the present invention is not limited to the configuration and the network in this shape of connection.

System configuration information acquisition unit 101 acquires, from a system in an actual operation, configuration information about the system in an actual operation on operational environment 200 and information about the used amount of resources of respective components. The information acquired by system configuration information acquisition unit 101 is, for example, information illustrated in FIGS. 3 and 4.

FIG. 3 is a table illustrating an example of the used amount of resources and the load amount of the system in an actual operation on operational environment 200 according to the first example embodiment. Further, in the first example embodiment, for example, a transmission control protocol (TCP) network load of 500 Mbps is applied to VM200-1 as an actually operating load.

FIG. 4 is a table illustrating an example of an upper-limit threshold of the used amount of resources of components of the system in an actual operation on operational environment 200 according to the first example embodiment. The upper-limit threshold of the used amount of resources of components of the system in an actual operation on operational environment 200 is represented by, for example, a Central Processing Unit (CPU) utilization and an Input/Output (IO) utilization.

When test load generation unit 103 generates a test load, test management unit 104 determines components required for addition so that the used amount of resources of components of the system in an actual operation on operational environment 200 does not exceed the upper-limit threshold, and determines a configuration change task. The configuration change task refers to information in which, for example, components that are determined by test management unit 104 to be newly added onto operational environment 200 are described. In this case, for simplicity, a value, obtained by calculating the used amount of resources in units of bits from the value of the used amount of resources illustrated in FIG. 3 and multiplying the calculated used amount of resources by an amount of the test load, is used as an estimated value.

In this case, however, a method for test management unit 104 and system configuration information acquisition unit 101 to acquire configuration information about the system in an actual operation on operational environment 200 and information about the used amount of resources of respective components is not limited in the present example embodiment. For example, the configuration information about the system in an actual operation on operational environment 200 and information about the used amount of resources of respective components may be directly provided by a user to test management unit 104 and system configuration information acquisition unit 101, or may be received and acquired from another component or another system.

Note that the used amount of resources is not limited to the CPU utilization and the IO utilization, but may include information about, for example, a capacity of a memory or storage and the amount of communication via a network.

Test configuration constructing unit 102 sets up, for example, a new VM, according to the configuration change task determined by test management unit 104, and reflects the VM on operational environment 200.

Figure 5:
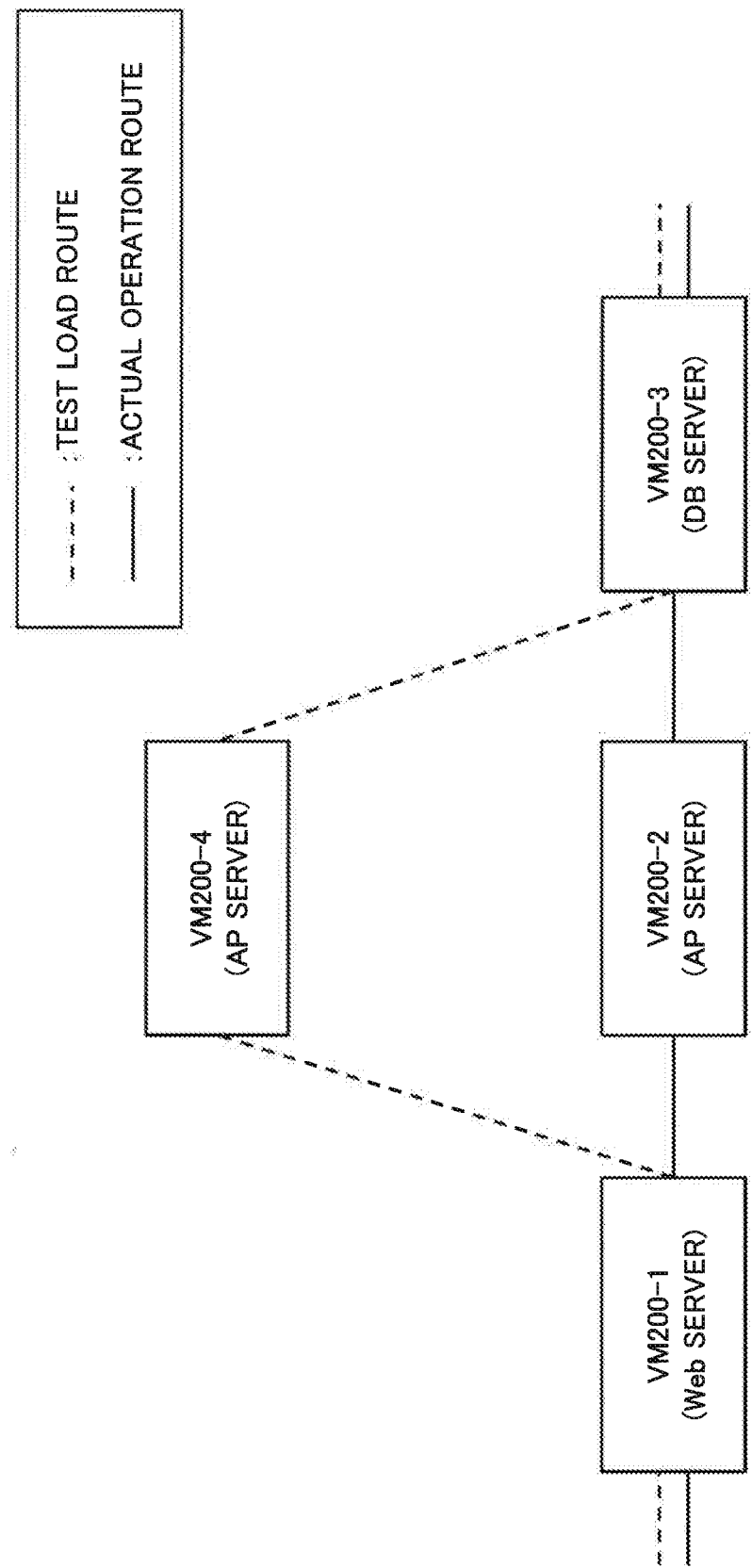
FIG. 5 is a diagram illustrating a minimum system configuration example in which test configuration constructing unit 102 according to the first example embodiment of the present invention adds a component on operational environment 200.

FIG. 5 is a diagram illustrating a configuration example of the system in which test configuration constructing unit 102 adds a component on operational environment 200 according to the first example embodiment. Test configuration constructing unit 102 adds, for example, VM200-4 to operational environment 200. Consequently, a test load generated by test load generation unit 103 passes as indicated by a dashed line in FIG. 5, so that the application of the test load to VM200-2 can be avoided.

After completion of the operation described in the configuration change task, a notification indicating that the reflection of the configuration change task is completed is sent to test management unit 104.

Test load generation unit 103 receives an instruction from test management unit 104 and generates a load described in the test scenario for the test target system. In the first example embodiment, for example, a load of 500 Mbps is generated for the test target system. As the type of a load generated by test load generation unit 103, pseudo data may be used, or data obtained by duplicating data actually flowing in the system in an actual operation on operational environment 200 may also be used. A method for test load generation unit 103 to generate a load is not limited in the present example embodiment.

Test management unit 104 provides system configuration information acquisition unit 101 with an instruction for acquiring the system configuration about the system in an actual operation on operational environment 200 and the used amount of resources of respective components, such as the CPU utilization and the IO utilization.

Test management unit 104 provides simulation unit 105 with an instruction for estimating the system configuration of the system when executing a test scenario singly and the used amount of resources of respective components, such as the CPU utilization and the IO utilization. The estimation of the system configuration indicates estimation of a system configuration required for carrying out a test scenario, such as the number of virtual machines to be used, or the number of resources to be allocated. The test scenario may include a performance test assuming a case where a network load is increased, and an operation test to be conducted after a certain virtual machine is replaced by another virtual machine. In the first example embodiment, it is assumed that the test scenario indicates an operation test for a system in which an AP server (VM200-2) having the configuration of the system in operation is replaced by a new AP server (VM200-4) and a test load of 500 Mbps that is the same as the load applied to the system in operation is set. FIG. 7 is a table illustrating an example of the used amount of resources estimated when a test scenario is executed singly. A technique for estimating the system configuration and a technique for estimating the used amount of resources are not limited in the present example embodiment.

For example, the system configuration and the used amount of resources of respective components of the system in an actual operation on operational environment 200, which is obtained from system configuration information acquisition unit 101, and a case where the test scenario estimated by simulation unit 105 is carried out singly are considered. In this case, test management unit 104 extracts a component (differential system component) as a difference caused in the system configuration or the used amount of resources from the system configuration of the system and the used amount of resources of respective components, and determines the configuration change task so that a load corresponding to the estimated used amount of resources is applied to the differential system component. In the first example embodiment, VM200-4 is a component to be newly added and thus corresponds to the differential system component, and VM200-1 and VM200-3 have no change in the used amount of resources, and thus do not correspond to the differential component. Test management unit 104 determines the configuration change task so that the estimated load amount of 400 Mbps is applied to VM200-4.

In order to determine the configuration change task, as illustrated in FIG. 5, test management unit 104 first estimates the used amount of resources when a test load is applied in the system configuration (minimum test system configuration) in which all components of the system in operation other than the component to be newly added (VM200-4) are used. Since the test load of 400 Mbps is applied to VM200-4, VM200-1 needs a test load of 500 Mbps to be applied thereto, so that a load of 1 Gbps including the test load of 500 Mbps and the load of 500 Mbps of the network in an actual operation is applied. Similarly, a test load of 200 Mbps is also applied to VM200-3, so that a load of 400 Mbps including the test load of 200 Mbps and the load of 200 Mbps of the network in an actual operation is applied. FIG. 8 is a table illustrating an example of the estimated value of the used amount of resources of respective components when a test scenario is carried out in the minimum test system configuration on operational environment 200. In FIG. 8, for simplicity of explanation, it is assumed that a value is obtained by adding the used amount of resources and the load amount of the system running on operational environment 200 illustrated in FIG. 3 to the estimated value of the used amount of resources when the test scenario output from simulation unit 105 illustrated in FIG. 7 is carried out singly, and the value becomes the used amount of resources of respective components required when the test scenario is operated on operational environment 200. In this case, however, the calculation method for determining the configuration change task is not limited to these methods.

Test management unit 104 compares the estimated value of the used amount of resources of respective components, for example, when the test scenario illustrated in FIG. 8 is carried out on operational environment 200 with the upper-limit threshold of the used amount of resources of components of the system in an actual operation on operational environment 200 illustrated in FIG. 4. Test management unit 104 determines the configuration change task so as not to exceed the upper-limit threshold.

During the test scenario is carried out on operational environment 200, when the estimated value of the used amount of resources of respective components does not exceed the upper-limit threshold of the used amount of resources of components of the system in an actual operation on operational environment 200, test management unit 104 instructs test configuration constructing unit 102 to apply the configuration change task to operational environment 200.

During the test scenario is carried out on operational environment 200, when the estimated value of the used amount of resources of respective components exceeds the upper-limit threshold of the used amount of resources of components of the system in an actual operation on operational environment 200, test management unit 104 adds a determination for newly adding a component on operational environment 200 to the configuration change task.

Figure 9:
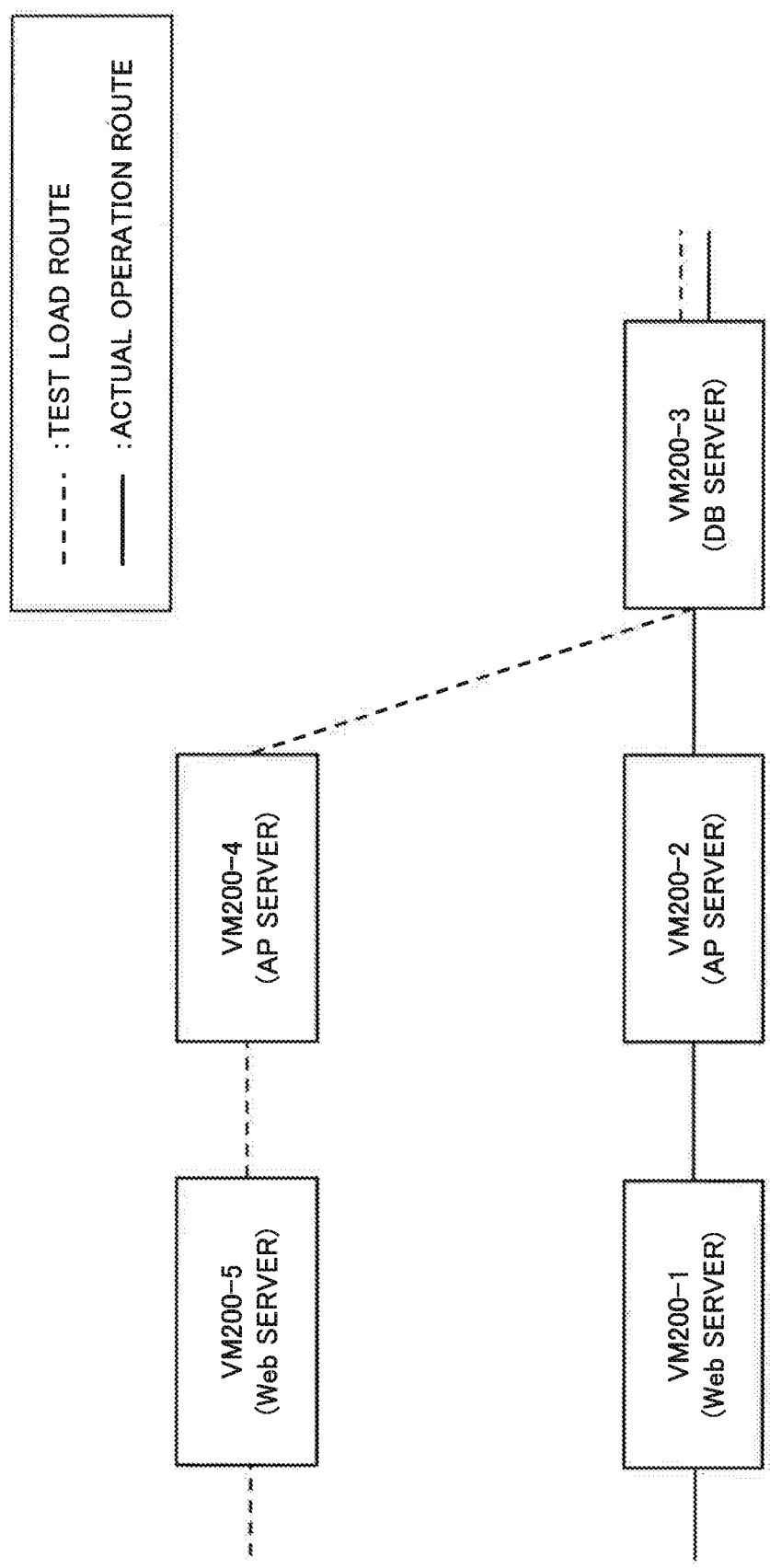
FIG. 9 is a diagram illustrating a system configuration example in which test configuration constructing unit 102 according to the first example embodiment of the present invention adds a component on operational environment 200.

For example, in the first example embodiment, when the test scenario is carried out on operational environment 200, it is estimated that the used amount of resources of VM200-1 is 100%, which is more than the upper-limit threshold of 80% of the used amount of resources of the system in an actual operation on operational environment 200. Test management unit 104 adds WEB server VM200-5 having the same function as VM200-1 on operational environment 200 for VM200-1 to construct the system configuration as illustrated in FIG. 9, and adds a configuration change task for changing a path so as to prevent the test load from flowing to VM200-1. In this case, however, the component to be added is not limited to a VM, but instead may be a network link or the like.

During the test scenario is carried out on operational environment 200, when the used amount of resources does not exceed the upper-limit threshold of each component in all components, test management unit 104 instructs test configuration constructing unit 102 to apply the configuration change task to operational environment 200. Note that the configuration change task is cleared immediately before the next construction is considered, or immediately after the current test is completed.

Upon reception of a notification indicating that the reflection of the configuration change task is completed from test configuration constructing unit 102, test management unit 104 instructs test load generation unit 103 to generate a load.

Figure 6:
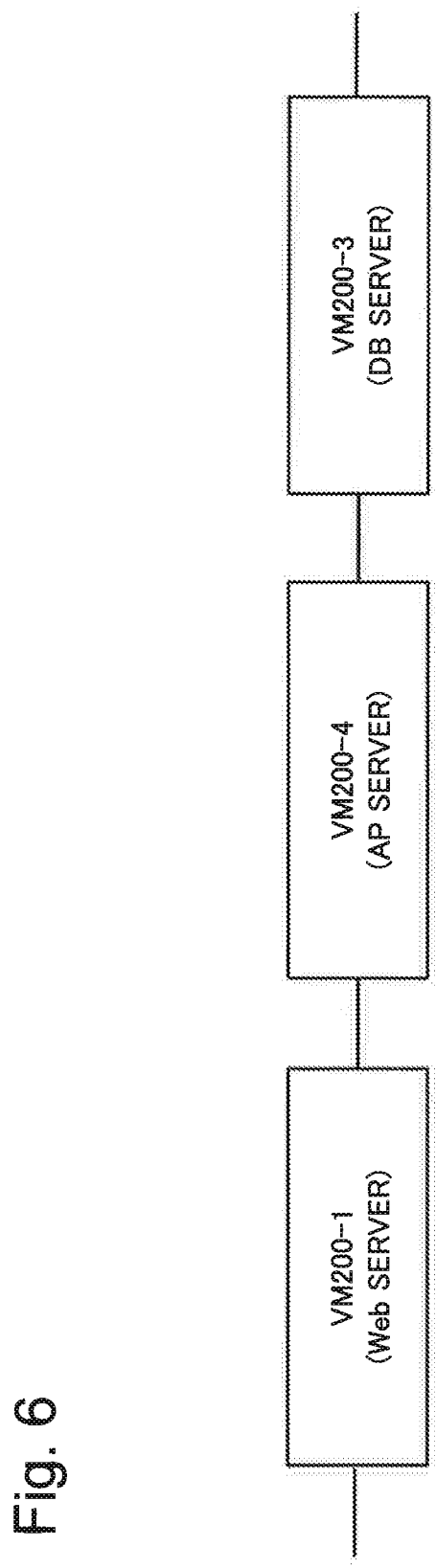
FIG. 6 is a diagram illustrating a system configuration example when a test scenario is carried out singly according to the first example embodiment of the present invention.

Simulation unit 105 acquires a test scenario from test scenario storage unit 106, estimates the used amount of resources of respective components and the system configuration when the test scenario is carried out on operational environment 200, and outputs the used amount of resources of respective components and the system configuration to test management unit 104. FIG. 6 is a diagram illustrating a system configuration estimated by simulation unit 105.

Test scenario storage unit 106 stores a test scenario in which test contents are defined, which are carried out in operational environment 200.

FIG. 10 is a table illustrating an example of the test scenario carried out on operational environment 200 according to the first example embodiment. For simplicity of explanation, the test scenario illustrated in FIG. 10 has a content that a load of 500 Mbps is generated for 120 seconds. Also, it is assumed that, in the test scenario illustrated in FIG. 10, the load is duplicated from actual data. A configuration change for replacing VM200-2 of the system by VM200-4 is also included as a test scenario.

[Description of Operation]

An operation of test management unit 104 according to the first example embodiment of the present invention will be described with reference to FIGS. 11 and 12.

Figure 11:
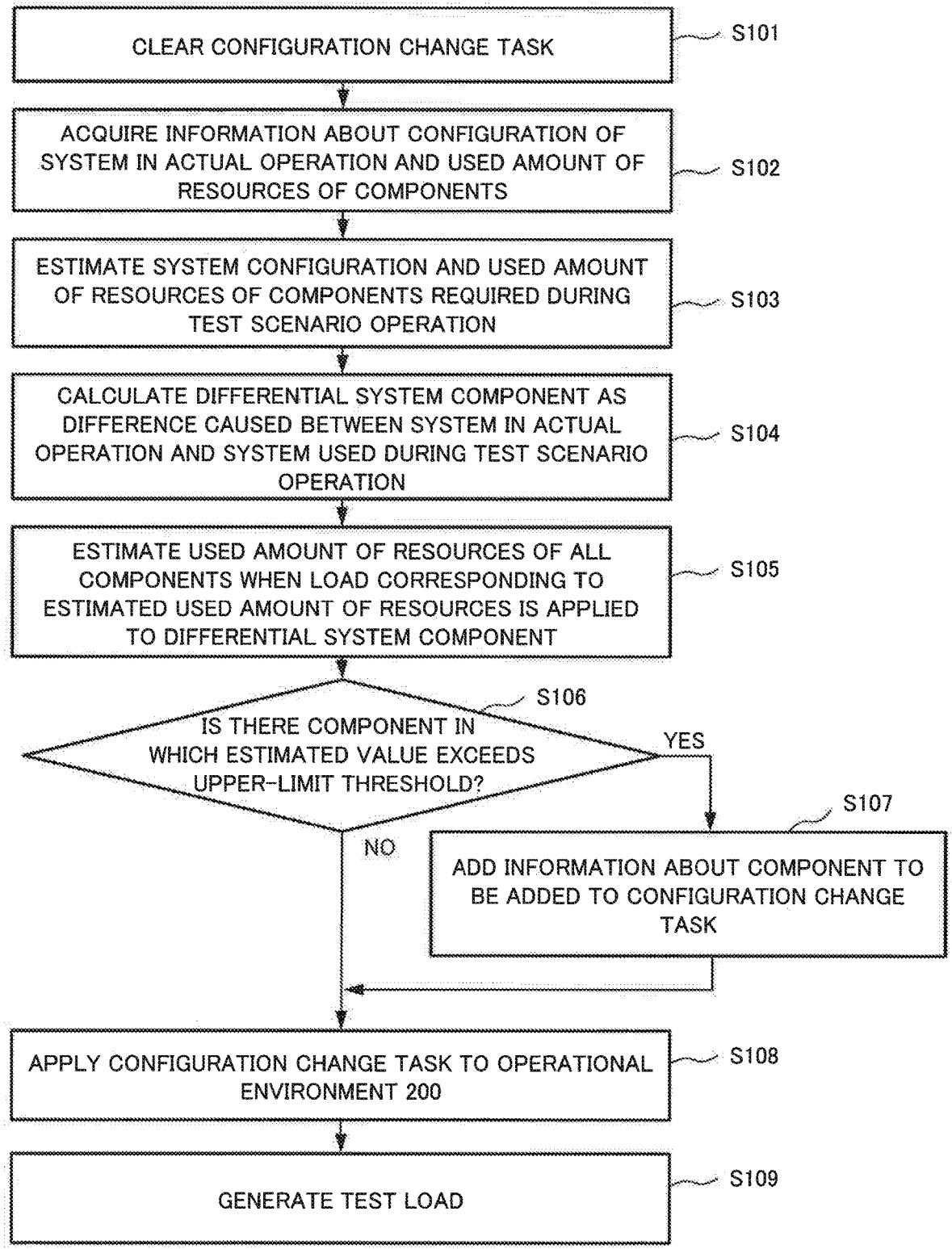
FIG. 11 is a flowchart illustrating an operational example of test management system 100 according to the first example embodiment of the present invention.

FIG. 11 is a flowchart illustrating an operational example of the test management system according to the first example embodiment. FIG. 12 is a sequence diagram illustrating an operational example of the test management system according to the first example embodiment.

Test management unit 104 clears a configuration change task (S101). Note that the operation of clearing the configuration change task may be performed, for example, immediately after the configuration change task is applied. FIG. 11 illustrates an operation of clearing the configuration change task immediately before acquisition of the configuration information about the system operated by test management unit 104 and the used amount of resources of respective components.

Test management unit 104 acquires, from system configuration information acquisition unit 101, the configuration information about the system in an actual operation and the used amount of resources of respective components (S102).

Test management unit 104 instructs simulation unit 105 to estimate the system configuration and the used amount of resources of respective components required when the test scenario is operated. The simulation unit acquires a test scenario from test scenario storage unit 106, and estimates the system configuration and the used amount of resources of respective components required when the test scenario is operated (S103).

Test management unit 104 calculates a component as a difference caused in the system configuration or the used amount of resources by using the configuration information and the used amount of resources of respective components of the system in an actual operation, and the system configuration and the used amount of resources of respective components required for test scenario operation (S104).

Test management unit 104 estimates the used amount of resources of respective components when a load corresponding to the estimated used amount of resources is applied to the differential system component by using the system in operation (S105).

When there is a component in which the estimated value of the used amount of resources necessary, during the test scenario is operated on operational environment 200, exceeds the upper-limit threshold of the used amount of resources on operational environment 200 that is actually operating (Yes in S106), test management unit 104 adds an instruction for adding a new component to the components of the system in an actual operation to the configuration change task (S107), and issues an instruction for applying the configuration change task to operational environment 200 (S108).

When there is no component in which the estimated value of the used amount of resources required when the test scenario is operated on operational environment 200 exceeds the upper-limit threshold of the used amount of resources of components on operational environment 200 (No in S106), test management unit 104 issues to test configuration constructing unit 102 an instruction for applying the configuration change task to operational environment 200 (S108).

After completion of the operation for applying the configuration change task to operational environment 200, test configuration constructing unit 102 sends a notification indicating the completion of the application to test management unit 104.

Upon reception of the notification indicating the completion of the operation for applying the configuration change task to operational environment 200 from test configuration constructing unit 102, test management unit 104 requests test load generation unit 103 to generate a load according to the test scenario.

Upon receiving the request from test management unit 104, test load generation unit 103 generates a load according to the test scenario (S109).

Description of Advantageous Effects

As described above, in the first example embodiment of the present invention, a differential component between the system in operation and the system used when a test scenario is executed singly are limited to a test target, thereby enabling a test using free resources of an operating system other than the test target. Furthermore, when the estimated value of the used amount of resources required, during the test scenario is operated on operational environment 200, exceeds the upper-limit threshold of the used amount of resources of components on operational environment 200, a lack of resources on operational environment 200 is supplemented and the estimated value of the used amount of resources required during the test scenario is operated on operational environment 200 is set so as not to exceed the upper-limit threshold of the used amount of resources of components on operational environment 200. Accordingly, in the case of conducting a test on operational environment 200, the test can be conducted by adding a minimum amount of deficient resources. Accordingly, in the case of carrying out the test scenario, for example, the amount of resources to be added can be suppressed by using the components on operational environment 200 and adding only the deficient resources as in the first example embodiment, instead of duplicating all components constituting operational environment 200.

Further, the used amount of resources of components on operational environment 200 is set so as not to exceed the upper-limit threshold, thereby enabling to minimize the possibility of occurrence of a performance bottleneck while a test is carried out.

Furthermore, since a test is conducted by using the components on operational environment 200, a risk of occurrence of an unexpected fault can be suppressed to minimum, as compared to a case where, for example, a test is conducted under an environment where the components on operational environment 200 are duplicated.

Second Example Embodiment

[Description of Configuration]

A second example embodiment of the present invention will be described in detail with reference to the drawings. Note that a technique according to the second example embodiment can be applied to the first example embodiment and example embodiments to be described below.

A configuration example of a communication system according to the second example embodiment is similar to the configuration example of the communication system according to the first example embodiment illustrated in FIG. 1, and thus detailed descriptions thereof are omitted.

Figure 13:
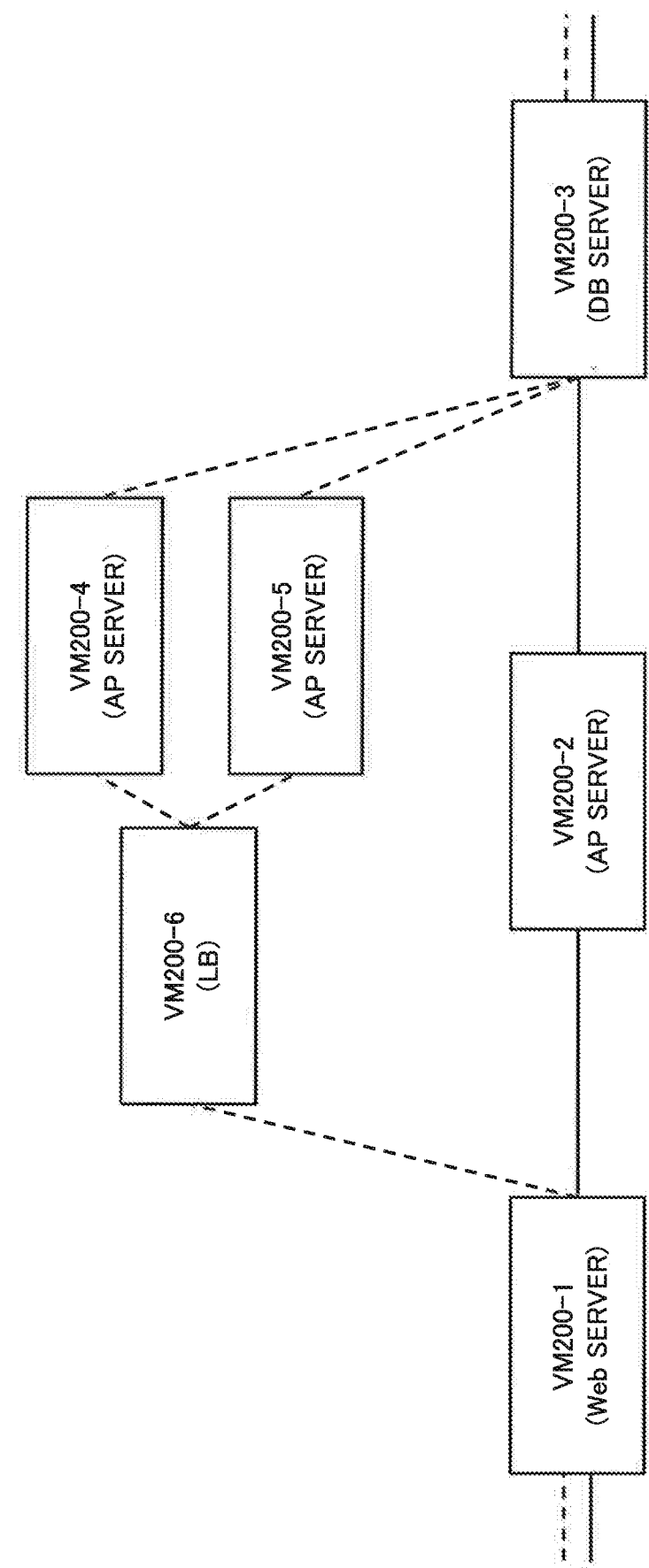
FIG. 13 is a diagram illustrating a configuration example of a system to be constructed on operational environment 200 according to a second example embodiment of the present invention.

FIG. 13 illustrates a configuration example of a system in which test configuration constructing unit 102 adds a component onto operational environment 200 according to the second example embodiment.

In the second example embodiment, as illustrated in FIG. 13, VM200-2 is scaled out, and VM200-4, VM200-5, and VM200-6 serving as a load balancer (LB) for sorting traffic are set as new components.

In the second example embodiment, test management unit 104 instructs test configuration constructing unit 102 to add an LB through a configuration change task. Accordingly, for example, even when a used amount of resources on operational environment 200 reaches an upper-limit threshold, the used amount of resources on operational environment 200 can be increased by adding a new VM.

Note that the configuration of test management unit 104 is similar to the configuration example of test management unit 104 according to the first example embodiment illustrated in FIG. 2, and thus detailed descriptions thereof are omitted.

Figure 12:
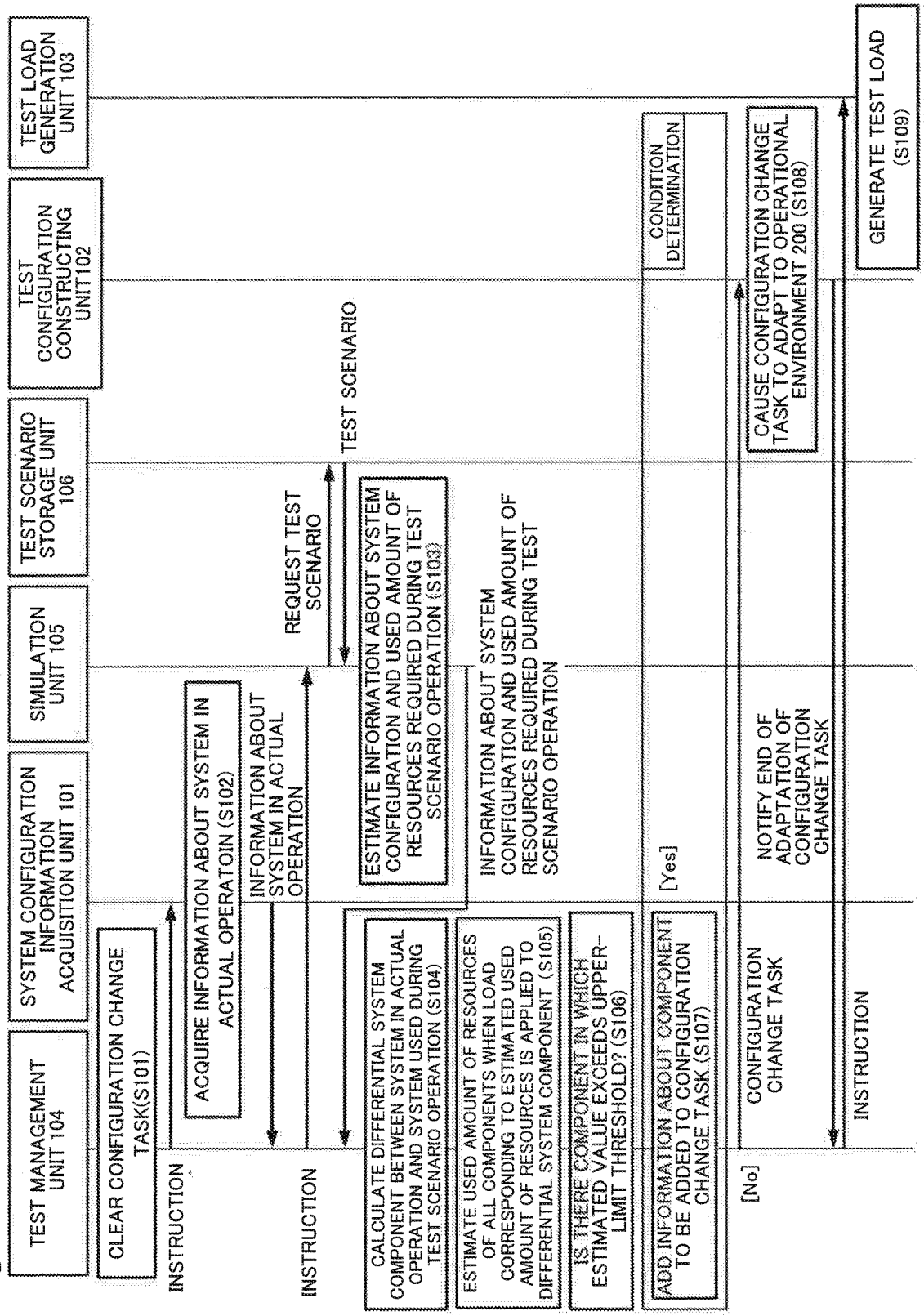
FIG. 12 is a sequence diagram illustrating an operational example of test management system 100 according to the first example embodiment of the present invention.

Further, operational examples are similar to those in step S101 to S109 in the first example embodiment illustrated in FIGS. 11 and 12, and thus detailed descriptions thereof are omitted.

Third Example Embodiment

[Description of Configuration]

A third example embodiment of the present invention will be described in detail with reference to the drawings.

Figure 14:
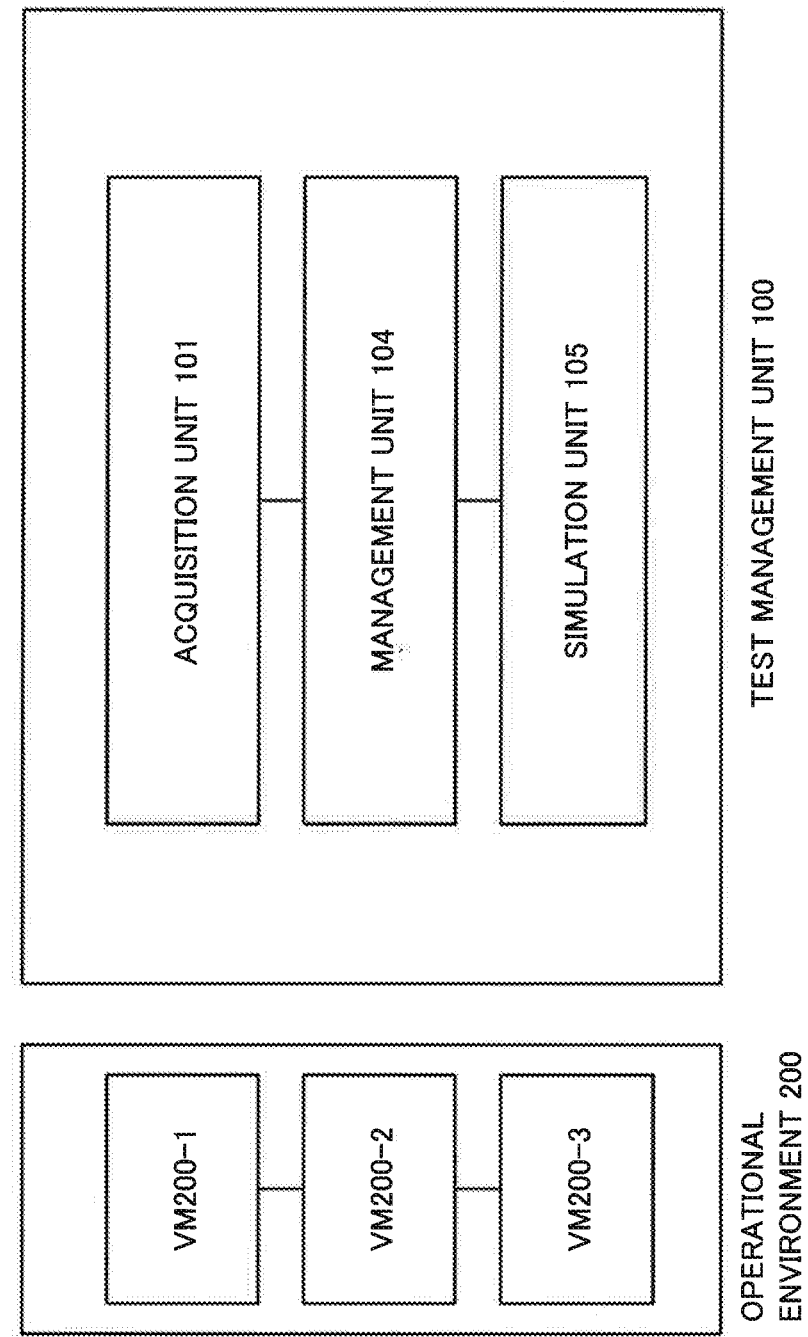
FIG. 14 is a diagram illustrating a configuration example of test management system 100 and a configuration example of operational environment 200 according to a third example embodiment of the present invention.

FIG. 14 is a diagram illustrating a configuration example of operational environment 200 and a configuration example of test management system 100 according to the third example embodiment of the present invention.

As illustrated in FIG. 14, test management system 100 includes acquisition unit 101, management unit 104, and simulation unit 105. Note that acquisition unit 101 and management unit 104 respectively correspond to system configuration information acquisition unit 101 and test management unit 104 according to the first example embodiment.

Simulation unit 105 estimates a system configuration and a used amount of resources required when a single test is executed. Specifically, simulation unit 105 estimates the system configuration and the used amount of resources of respective components when a test scenario is carried out on operational environment 200, and outputs the system configuration and the used amount of resources to management unit 104.

Acquisition unit 101 acquires information about the used amount of a plurality of resources included in a system in operation. Specifically, acquisition unit 101 acquires, from a system in an actual operation, the configuration information about the system in an actual operation on operational environment 200 and information about the used amount of resources of respective components of the system.

Management unit 104 calculates a differential system component different from the configuration of the system in operation for the system configuration estimated by simulation unit 105, and determines a free resource and a resource to be newly added in the system in operation to be used for applying a load to a differential system component. Specifically, for example, management unit 104 extracts a component (differential system component) in which a difference is caused in the system configuration or the used amount of resources from, for example, the used amount of resources of respective components and the system configuration of the system in an actual operation on operational environment 200 obtained from acquisition unit 101, and from the used amount of resources of respective components and the system configuration of the system used when the test scenario estimated by simulation unit 105 is carried out singly. Management unit 104 determines the configuration change task so that a load corresponding to the estimated used amount of resources is applied to the differential system component. Note that the configuration change task is, for example, information in which a component that is determined by management unit 104 to be newly added on operational environment 200 is described.

[Description of Operation]

Figure 15:
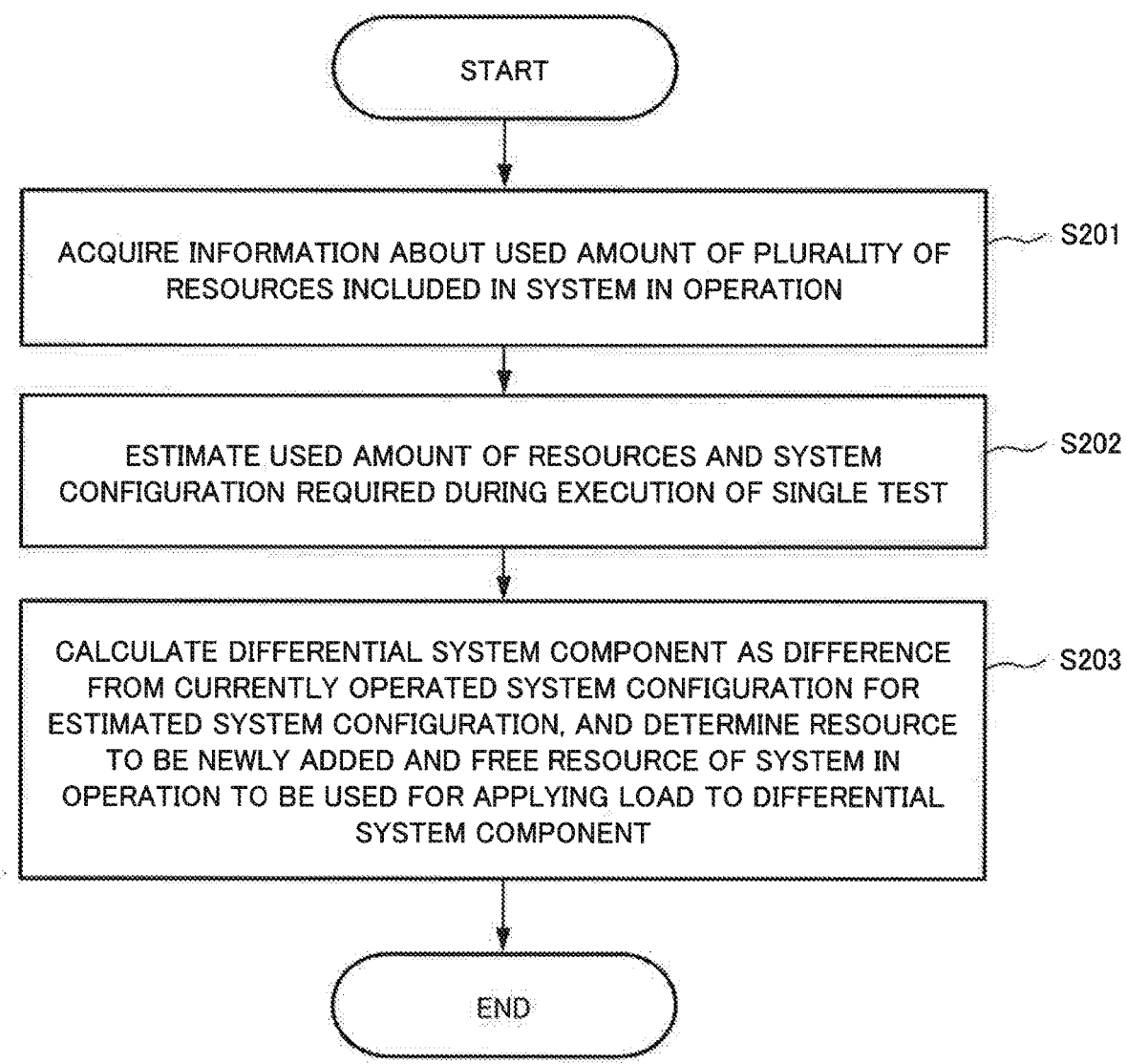
FIG. 15 is a flowchart illustrating an operational example of test management system 100 according to the third example embodiment of the present invention.

FIG. 15 is a flowchart illustrating an operational example of test management system 100 according to the third example embodiment of the present invention.

Acquisition unit 101 acquires information about the used amount of a plurality of resources included in a system in operation (S201).

Simulation unit 105 estimates the used amount of resources and the system configuration required for execution of a single test (S202).

Management unit 104 calculates a differential system component different from the configuration of the system in operation which is acquired by acquisition unit 101 for the system configuration estimated by simulation unit 105, and determines a free resource and a resource to be newly added in the system in operation to be used, for applying a load to the differential system component (S203).

Figure 16:
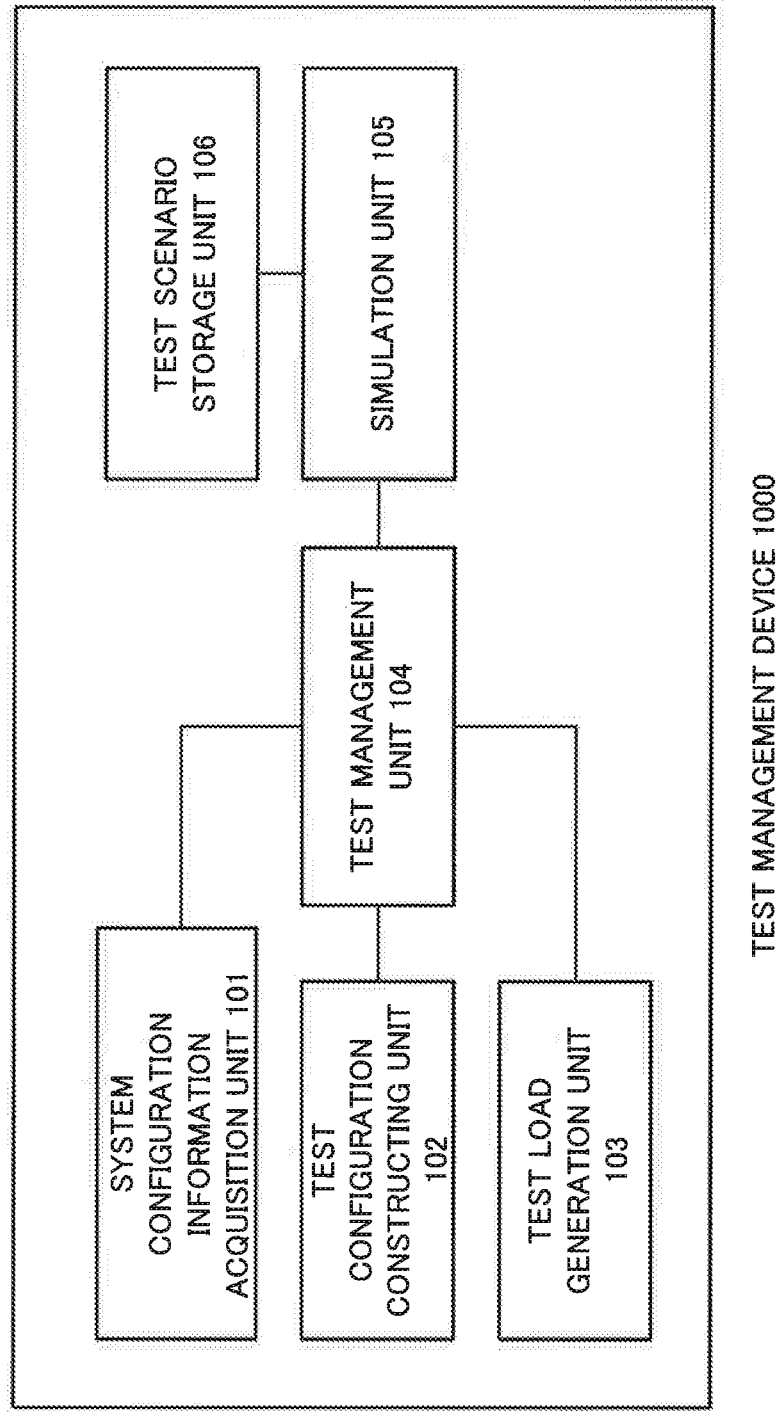
FIG. 16 is a diagram illustrating a configuration example of test management device 1000 according to an example embodiment of the present invention.

FIG. 16 is a diagram illustrating a configuration example of test management device 1000 according to an example embodiment of the present invention. As illustrated in FIG. 16, test management device 1000 may include respective functions of test management system 100 as components and may execute a performance test.

Further, a computer, a CPU, a Micro-Processing Unit (MPU), or the like of test management device 1000 may execute software (program) for implementing the functions according to each of the example embodiments described above. For example, software (program) for implementing the functions according to each of the example embodiments described above may be acquired via various storage media, such as a Compact Disc Recordable (CD-R), or a network. A program acquired by test management device 1000 and a storage medium storing the program constitute this example embodiment. Note that the software (program) may be preliminarily stored in, for example, a predetermined storage unit included in test management device 1000. A computer, a CPU, an MPU, or the like of test management device 1000 may load and execute a program code for the acquired software (program).

While the example embodiments of the present invention have been described above, the present invention is not limited to the example embodiments described above. The present invention can be carried out based on modification, replacement, and adjustment of each example embodiment. The present invention can be carried out by arbitrarily combining the example embodiments. In other words, the present invention includes various modifications and corrections that can be made according to all the contents disclosed herein and the technical idea.

The whole or part of the example embodiments described above can be described as, but not limited to, the following supplementary notes.

[Supplementary Notes 1]

A management system that conducts a test using a system in operation, the management system comprising:
  simulation means that estimates a system configuration and a used amount of a plurality of resources being required for executing the test singly;
  acquisition means that acquires information about the used amount of the plurality of resources included in the system in operation; and
  management means that calculates a differential system component different from the configuration of the system in operation for the estimated system configuration, and determines a free resource and a resource to be newly added in the system in operation, the free resource and the resource to be newly added being used for applying a load to the differential system component.

[Supplementary Notes 2]

The management system according to Supplementary Notes 1, wherein the management means estimates a used amount of each resource of all system components when a load is applied to the differential system component, determines whether or not a used amount of the resource exceeds a predetermined threshold, and determines the resource to be newly added when determining that the used amount of the resource exceeds the predetermined threshold.

[Supplementary Notes 3]

The management system according to Supplementary Notes 1 or 2, wherein the management means calculates a difference between a used amount of a plurality of resources included in the system in operation and a used amount of a plurality of resources in a system required for executing the test singly, and when a difference is present, the management means calculates the difference as the differential system component.

[Supplementary Notes 4]

The management system according to Supplementary Notes 1 or 2, wherein the management means calculates a difference between a component of the system in operation and a system component required for executing the test singly, and when a difference is present, the management means calculates the component as the differential system component.

[Supplementary Notes 5]

The management system according to any one of Supplementary Notes 1 to 4, further comprising constructing means that adds the resource to be newly added to the system in operation, the resource to be newly added being determined by the management means, wherein,
    upon reception of a notification of information about the resource to be newly added from the management means, the constructing means constructs the resource to be newly added in the system in operation.

[Supplementary Notes 6]

The management system according to any one of Supplementary Notes 1 to 5, further comprising load generation means that generates a load for the test.

[Supplementary Notes 7]

The management system according to Supplementary Notes 6, further comprising storage means that stores a plurality of test scenarios, wherein
    the simulation means acquires, from the plurality of test scenarios stored in the storage means, a scenario corresponding to a test to be executed on the system in operation, and
    the load generation means generates a load for the test, based on the test scenario acquired by the simulation means.

[Supplementary Notes 8]

The management system according to any one of Supplementary Notes 1 to 7, wherein
    each of the plurality of resources is virtually executed by a virtual machine, and
    the management means determines a virtual machine to be newly added, based on the estimated used amount of the plurality of resources.

[Supplementary Notes 9]

A test method for conducting a test using a system in operation, the test method comprising:
    estimating a system configuration and a used amount of a plurality of resources being required for executing the test singly;
    acquiring information about the plurality of resources included in the system in operation; and
    calculating a differential system component different from the configuration of the system in operation for the estimated system configuration, and executing the test by determining a free resource and a resource to be newly added in the system in operation, the free resource and the resource to be newly added being used for applying a load to the differential system component.

[Supplementary Notes 10]

The test method according to Supplementary Notes 9, wherein execution of the test by determining the resources further includes estimating a used amount of resources of all system components when a load is applied to the differential system component, determining whether or not a used amount of the resources exceeds a predetermined threshold, and determining the resource to be newly added when determining that the used amount of the plurality of resources exceeds the predetermined threshold.

[Supplementary Notes 11]

The test method according to Supplementary Notes 9 or 10, wherein execution of the test by determining the resources further includes calculating a difference between a used amount of a plurality of resources included in the system in operation and a used amount of a plurality of resources in a system required for executing the test singly, and calculating, when a difference is present, the difference as the differential system component.

[Supplementary Notes 12]

The test method according to any one of Supplementary Notes 9 to 11, wherein execution of the test by determining the resources further includes calculating a difference between a component of the system in operation and a system component required for executing the test singly, and calculating, when a difference is present, the component as the differential system component.

[Supplementary Notes 13] The test method according to any one of Supplementary Notes 9 to 12, further comprising:
    adding the determined resource to be newly added to the system in operation; and
    constructing, upon reception of a notification of information about the resource to be newly added, the resource to be newly added in the system in operation.

[Supplementary Notes 14]

The test method according to any one of Supplementary Notes 9 to 13, further comprising generating a load for the test.

[Supplementary Notes 15]

The test method according to Supplementary Notes 14, further comprising:
    storing a plurality of test scenarios;
    acquiring, from the plurality of stored test scenarios, a scenario corresponding to a test to be executed on the system in operation; and
    generating a load for the test, based on the acquired test scenario.

[Supplementary Notes 16]

The test method according to any one of Supplementary Notes 9 to 15, further comprising:
    virtually executing each of the plurality of resources by a virtual machine; and
    determining a virtual machine to be newly added, based on the estimated used amount of the plurality of resources.

[Supplementary Notes 17]

A recording medium storing a program causing a computer to execute a test using a system in operation, the program causing the computer to execute processing of:
    estimating a system configuration and a used amount of a plurality of resources being required for executing the test singly;
    acquiring information about the plurality of resources included in the system in operation; and
    calculating a differential system component different from the configuration of the system in operation for the estimated system configuration, and executing a test by determining a free resource and a resource to be newly added in the system in operation, the free resource and the resource to be newly added being used for applying a load to the differential system component.

[Supplementary Notes 18]

The recording medium according to Supplementary Notes 17, wherein the program causes the computer to further execute processing of estimating a used amount of resources of all system components when a load is applied to the differential system component, determining whether or not a used amount of the resources exceeds a predetermined threshold, and determining the resource to be newly added when determining that the used amount of the plurality of resources exceeds the predetermined threshold.

This application is based upon and claims the benefit of priority from Japanese patent application No. 2016-032595, filed on Feb. 24, 2016, the disclosure of which is incorporated herein in its entirety by reference.

REFERENCE SIGNS LIST

100 Test management system
101 System configuration information acquisition unit
102 Test configuration constructing unit
103 Test load generation unit
104 Test management unit
105 Simulation unit
106 Test scenario storage unit
200 Operational environment
200-1, 200-2, 200-3, 200-4, 200-5, 200-6 VM

What is claimed is:

1. A management system that conducts a test using a system in operation, the management system comprising:
a memory and
one or more processors configured to function as:
simulation unit configured to estimate a system configuration and a used amount of a plurality of resources being required for executing the test singly;
acquisition unit configured to acquire information about the used amount of the plurality of resources included in the system in operation; and
management unit configured to calculate a differential system component different from the configuration of the system in operation for the estimated system configuration, and determines a free resource and a resource to be newly added in the system in operation, the free resource and the resource to be newly added being used for applying a load to the differential system component.

2. The management system according to claim 1, wherein the management unit estimates a used amount of each resource of all system components when a load is applied to the differential system component, determines whether or not a used amount of the resource exceeds a predetermined threshold, and determines the resource to be newly added when determining that the used amount of the resource exceeds the predetermined threshold.

3. The management system according to claim 1, wherein the management unit calculates a difference between a used amount of a plurality of resources included in the system in operation and a used amount of a plurality of resources in a system required for executing the test singly, and when a difference is present, the management unit calculates the difference as the differential system component.

4. The management system according to claim 1, wherein the management unit calculates a difference between a component of the system in operation and a system component required for executing the test singly, and when a difference is present, the management unit calculates the component as the differential system component.

5. The management system according to claim 1, further comprising constructing unit configured to add the resource to be newly added to the system in operation, the resource to be newly added being determined by the management unit, wherein,
upon reception of a notification of information about the resource to be newly added from the management unit, the constructing unit constructs the resource to be newly added in the system in operation.

6. The management system according to claim 1, further comprising load generation unit configured to generate a load for the test.

7. The management system according to claim 6, further comprising storage unit configured to store a plurality of test scenarios, wherein
the simulation unit acquires, from the plurality of test scenarios stored in the storage unit, a scenario corresponding to a test to be executed on the system in operation, and
the load generation unit generates a load for the test, based on the test scenario acquired by the simulation unit.

8. The management system according to claim 1, wherein each of the plurality of resources is virtually executed by a virtual machine, and
the management unit determines a virtual machine to be newly added, based on the estimated used amount of the plurality of resources.

9. A test method for conducting a test using a system in operation, the test method comprising:
estimating a system configuration and a used amount of a plurality of resources being required for executing the test singly;
acquiring information about the plurality of resources included in the system in operation; and
calculating a differential system component different from the configuration of the system in operation for the estimated system configuration, and executing the test by determining a free resource and a resource to be newly added in the system in operation, the free resource and the resource to be newly added being used for applying a load to the differential system component.

10. The test method according to claim 9, wherein execution of the test by determining the resources further includes estimating a used amount of resources of all system components when a load is applied to the differential system component, determining whether or not a used amount of the resources exceeds a predetermined threshold, and determining the resource to be newly added when determining that the used amount of the plurality of resources exceeds the predetermined threshold.

11. The test method according to claim 9, wherein execution of the test by determining the resources further includes calculating a difference between a used amount of a plurality of resources included in the system in operation and a used amount of a plurality of resources in a system required for executing the test singly, and calculating, when a difference is present, the difference as the differential system component.

12. The test method according to claim 9, wherein execution of the test by determining the resources further includes calculating a difference between a component of the system in operation and a system component required for executing the test singly, and calculating, when a difference is present, the component as the differential system component.

13. The test method according to claim 9, further comprising:
adding the determined resource to be newly added to the system in operation; and
constructing, upon reception of a notification of information about the resource to be newly added, the resource to be newly added in the system in operation.

14. The test method according to claim 9, further comprising generating a load for the test.

15. The test method according to claim 14, further comprising:
storing a plurality of test scenarios;
acquiring, from the plurality of stored test scenarios, a scenario corresponding to a test to be executed on the system in operation; and
generating a load for the test, based on the acquired test scenario.

16. The test method according to claim 9, further comprising:
virtually executing each of the plurality of resources by a virtual machine; and
determining a virtual machine to be newly added, based on the estimated used amount of the plurality of resources.

17. A non-transitory computer readable recording medium storing a program causing
a computer to execute a test using a system in operation, the program causing the computer to execute processing of:
estimating a system configuration and a used amount of a plurality of resources being required for executing the test singly;
acquiring information about the plurality of resources included in the system in operation; and
calculating a differential system component different from the configuration of the system in operation for the estimated system configuration, and executing a test by determining a free resource and a resource to be newly added in the system in operation, the free resource and the resource to be newly added being used for applying a load to the differential system component.

18. The recording medium according to claim 17, wherein the program causes the computer to further execute processing of estimating a used amount of resources of all system components when a load is applied to the differential system component, determining whether or not a used amount of the resources exceeds a predetermined threshold, and determining the resource to be newly added when determining that the used amount of the plurality of resources exceeds the predetermined threshold.

19. The management system according to claim 2, wherein the management unit calculates a difference between a used amount of a plurality of resources included in the system in operation and a used amount of a plurality of resources in a system required for executing the test singly, and when a difference is present, the management unit calculates the difference as the differential system component.

20. The management system according to claim 2, wherein the management unit calculates a difference between a component of the system in operation and a system component required for executing the test singly, and when a difference is present, the management unit calculates the component as the differential system component.

* * * * *